United States Patent
Ganesan et al.

(10) Patent No.: US 10,761,858 B2
(45) Date of Patent: Sep. 1, 2020

(54) SYSTEM AND METHOD TO MANAGE A SERVER CONFIGURATION PROFILE OF AN INFORMATION HANDLING SYSTEM IN A DATA CENTER

(71) Applicant: DELL PRODUCTS, LP, Round Rock, TX (US)

(72) Inventors: Vaideeswaran Ganesan, Bangalore (IN); Naman Goel, Bangalore (IN); Abhijeet Bhattacharya, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 50 days.

(21) Appl. No.: 15/961,343

(22) Filed: Apr. 24, 2018

(65) Prior Publication Data

US 2019/0324769 A1   Oct. 24, 2019

(51) Int. Cl.
*G06F 1/24*    (2006.01)
*G06F 9/00*    (2006.01)
*G06F 9/445*   (2018.01)

(52) U.S. Cl.
CPC ................. *G06F 9/44505* (2013.01)

(58) Field of Classification Search
CPC .................................................. G06F 9/44505
See application file for complete search history.

(56) References Cited

U.S. PATENT DOCUMENTS

| | | |
|---|---|---|
| 5,727,928 A | 3/1998 | Brown |
| 5,857,102 A | 1/1999 | McChesney et al. |
| 6,567,849 B2 | 5/2003 | Ludovici et al. |
| 6,868,444 B1 | 3/2005 | Kim et al. |
| 7,904,734 B1 | 3/2011 | Singla et al. |
| 8,352,608 B1 | 1/2013 | Keagy et al. |
| 8,811,619 B2 | 8/2014 | Khatri et al. |
| 9,652,216 B2 | 3/2017 | Dharmadhikari et al. |
| 9,940,159 B1 | 4/2018 | Ovchinnikov et al. |
| 2003/0189905 A1 | 10/2003 | Lee |
| 2003/0225867 A1 | 12/2003 | Wedlake |
| 2006/0242626 A1 | 10/2006 | Pham et al. |
| 2007/0153443 A1 | 7/2007 | Lyons et al. |
| 2007/0156706 A1* | 7/2007 | Hayes ................... G06F 11/326 |
| 2008/0027785 A1* | 1/2008 | Mechaley, Jr. .... G06Q 30/0201 705/7.29 |
| 2009/0282143 A1 | 11/2009 | Mali |
| 2010/0131625 A1 | 5/2010 | Dehaan et al. |
| 2010/0186010 A1 | 7/2010 | Chalemin et al. |
| 2010/0306357 A1 | 12/2010 | Chen |

(Continued)

*Primary Examiner* — Mohammed H Rehman
(74) *Attorney, Agent, or Firm* — Larson Newman, LLP

(57) ABSTRACT

An information handling system includes a memory and a processor that determines to change a configuration setting for the information handling system and receives a remediation policy related to the configuration setting from a configuration management system in response to determining to change the configuration setting. The processor further determines from the first remediation policy that the change to the first configuration setting necessitates a configuration change to a device prior to changing the first configuration setting and changes the first configuration setting in response to a first indication that the second configuration setting of the device has been changed. The device is separate from the information handling system.

17 Claims, 6 Drawing Sheets

(56) References Cited

U.S. PATENT DOCUMENTS

| | | | |
|---|---|---|---|
| 2011/0055318 A1* | 3/2011 | Srinivasan | G06F 9/542 |
| | | | 709/203 |
| 2012/0131180 A1 | 5/2012 | Nomura et al. | |
| 2013/0185715 A1 | 7/2013 | Dunning et al. | |
| 2013/0198349 A1 | 8/2013 | Wright et al. | |
| 2014/0297827 A1* | 10/2014 | Kikuchi | H04L 41/0869 |
| | | | 709/223 |
| 2014/0298091 A1* | 10/2014 | Carlen | H04L 65/80 |
| | | | 714/15 |
| 2014/0324192 A1* | 10/2014 | Baskaran | G05B 15/02 |
| | | | 700/19 |
| 2015/0039806 A1* | 2/2015 | Green | G06F 3/0614 |
| | | | 711/103 |
| 2015/0120908 A1 | 4/2015 | Anderson et al. | |
| 2015/0304233 A1 | 10/2015 | Krishnamurthy et al. | |
| 2015/0324135 A1 | 11/2015 | Chan et al. | |
| 2016/0048405 A1 | 2/2016 | Ang et al. | |
| 2016/0066120 A1* | 3/2016 | Lee | H04L 67/22 |
| | | | 455/405 |
| 2016/0092343 A1 | 3/2016 | Chhatwal et al. | |
| 2016/0112252 A1 | 4/2016 | Notari | |
| 2016/0366135 A1 | 12/2016 | Furuichi et al. | |
| 2017/0075712 A1 | 3/2017 | Krishna et al. | |
| 2017/0116103 A1 | 4/2017 | Cencini et al. | |
| 2017/0139738 A1* | 5/2017 | Kim | G06F 9/45558 |
| 2017/0168797 A1 | 6/2017 | Pogrebinksy | |
| 2017/0168845 A1* | 6/2017 | Munger | G06F 9/4406 |
| 2017/0242446 A1* | 8/2017 | Truong | H04L 43/08 |
| 2018/0248749 A1 | 8/2018 | Chou et al. | |

* cited by examiner

SYSTEM AND METHOD TO MANAGE A SERVER CONFIGURATION PROFILE OF AN INFORMATION HANDLING SYSTEM IN A DATA CENTER

CROSS REFERENCE TO RELATED APPLICATIONS

Related subject matter is contained in co-pending U.S. patent application Ser. No. 15/961,332 entitled "System and Method to Manage Server Configuration Profiles in a Data Center," filed Apr. 24, 2018, the disclosure of which is hereby incorporated by reference.

Related subject matter is contained in co-pending U.S. patent application Ser. No. 15/961,352 entitled "System and Method to Manage a Server Configuration Profile based upon Applications Running on an Information Handling System," filed Apr. 24, 2018, the disclosure of which is hereby incorporated by reference.

FIELD OF THE DISCLOSURE

This disclosure generally relates to information handling systems, and more particularly relates to managing a server configuration profile in an information handling system of a data center.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory and a processor. The processor may determines to change a configuration setting for the information handling system and receive a remediation policy related to the configuration setting from a configuration management system in response to determining to change the configuration setting. The processor may further determine from the first remediation policy that the change to the first configuration setting necessitates a configuration change to a device prior to changing the first configuration setting, and change the first configuration setting in response to a first indication that the second configuration setting of the device has been changed. The device is separate from the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
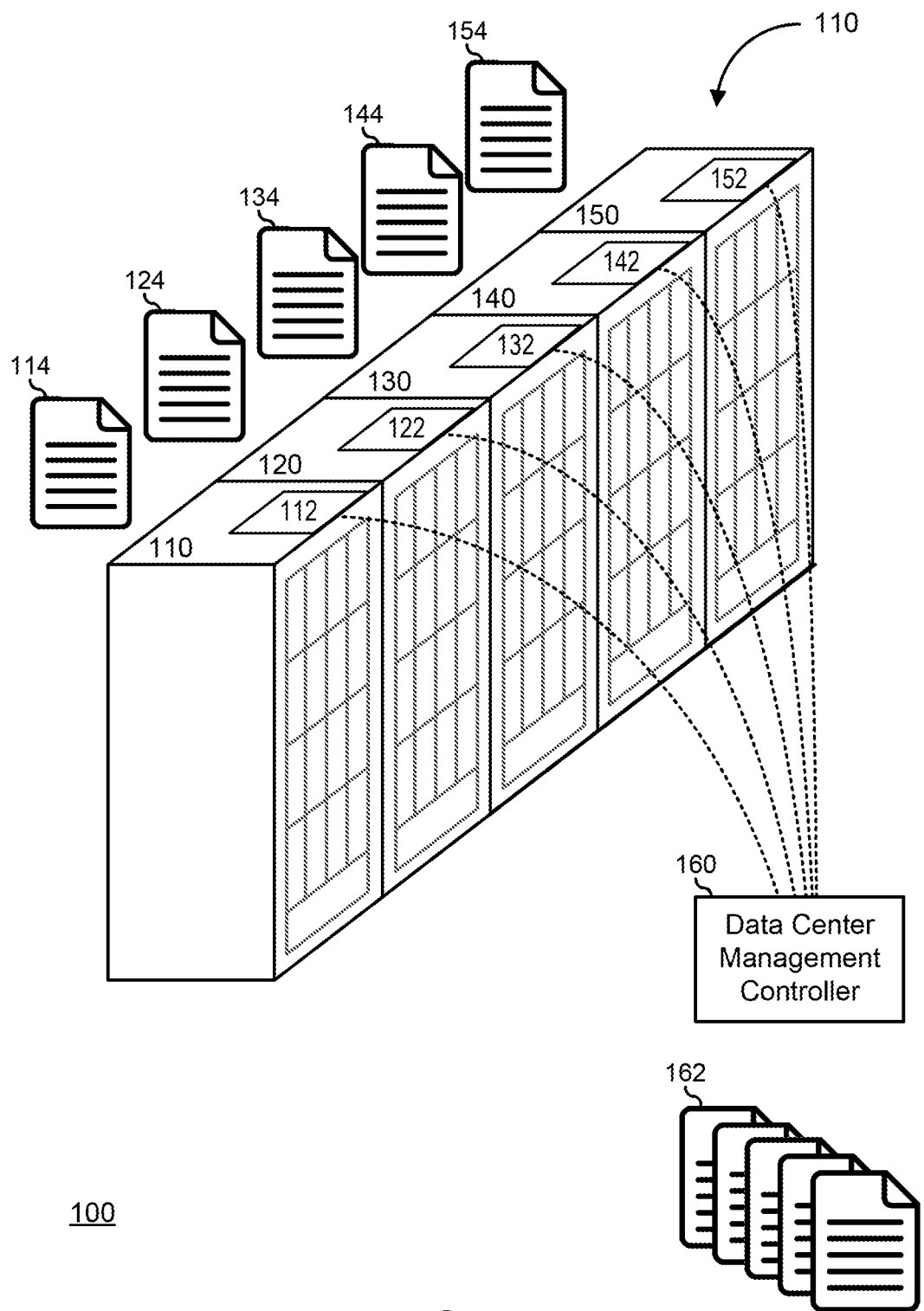
FIG. 1 is a block diagram of a data center according to an embodiment of the present disclosure.

FIG. 1 illustrates an embodiment of a data center 100 including server aisle 110, and a data center management controller (DCMC) 160. Server aisle 110 includes server racks 110, 120, 130, 140, and 150. Server racks 120, 130, 140, and 150 include various equipment that operates to perform the data storage and processing functions of data center 100. As such, one or more elements of data center 100, including the equipment in server racks 120, 130, 140, and 150 and DCMC 160 can be realized as an information handling system. Each of server racks 110, 120, 130, 140, and 150 includes a respective rack management controller (RMC) 112, 122, 132, 142, and 152. RMCs 112, 122, 132, 142, and 152 represent service processors that operate in accordance with an Intelligent Platform Management Interface (IPMI) functional implementation to provide monitoring, management, and maintenance functionality to the respective server racks 110, 120, 130, 140, and 150, and to the equipment therein. Examples of RMCs 112, 122, 132, 142, and 152 can include service processors, such as baseboard management controllers (BMCs), an Integrated Dell Remote Access Controller (iDRAC), another service processor, or a combination thereof. RMCs 112, 122, 132, 142, and 152, and DCMC 160 are connected together with various service processors associated with the equipment in server racks 110, 120, 130, 140, and 150 into a management network whereby the DCMC can remotely manage the equipment in the server racks.

The equipment in server racks 110, 120, 130, 140, and 150 include stand-alone servers, blade servers, storage arrays, I/O and network switches and routers, power supplies, and the like, as needed or desired. Each element of server racks 110, 120, 130, 140, and 150 needs to be configured to operate within the overall processing environment of data center 100. The configuration of each element is particular to the function provided by the element, the physical and virtual locations of the elements on various data and storage networks of data center 100, the desired management and environmental parameters of the data center and the particular elements, BIOS or UEFI settings, and the like. In general, each element of server racks 110, 120, 130, 140, and 150 includes a management controller such as a Baseboard Management Controller, or the like, that permits DCMC 160 to manage the configurations of the elements of the server racks. While each manageable parameter of the elements of server racks 110, 120, 130, 140, and 150 may be individually managed, in practical fact, many of the manageable parameters of the elements of the server racks will have similar configuration settings as other similar elements of the server rack. For example, BIOS settings, such as system controller settings, system clock settings, system boot configurations and boot order, and the like may be the same for all stand-alone servers or blade servers of a particular type.

As such, the elements of server racks 110, 120, 130, 140, and 150 are each configured based upon a Server Configuration Profile (SCP). A SCP embodies the concept of performing server configuration through a single file. As such, a SCP can be generated in a XML or JSON format and can be exported to the elements of server racks 110, 120, 130, 140, and 150 with an Export Server Configuration operation. Configuration changes can be edited into the SCP and can be applied to one or more of the elements of server racks 110, 120, 130, 140, and 150 with an Import Server Configuration operation. Thus, as illustrated, server rack 110 is associated with a SCP 114, server rack 120 is associated with a SCP 124, server rack 130 is associated with a SCP 134, server rack 140 is associated with a SCP 144, and server rack 150 is associated with a SCP 154. However, as described further below, it will be understood that each element of server racks 110, 120, 130, 140, and 150 will include its own SCP, and thus each of SCPs 114, 124, 134, 144, and 154 are illustrative of several SCPs, one for each element of the associated server rack. DCMC 160 creates, maintains, and implements SCPs 162 for the various types of elements within server racks 110, 120, 130, 140, and 150. An example of configuration settings that can be set utilizing SCPs 114, 124, 134, 144, and 154 includes BIOS configuration settings, such as BIOS passwords, BIOS boot mode (e.g. PXE, Legacy, UEFI, etc.), time zones and real-time clock (RTC) settings, BIOS boot order, and other configuration settings that are configurable via a BIOS setup utility, network configuration settings, such as static IP addresses, network adapter partitions, VLANs, and other network configuration settings, storage configuration settings such as RAID configuration settings, boot image locations, virtual drive settings, and other network configuration settings, management network settings such as management VLANs, environmental alarm limits, power limits and other management network settings, as needed or desired.

Figure 2:
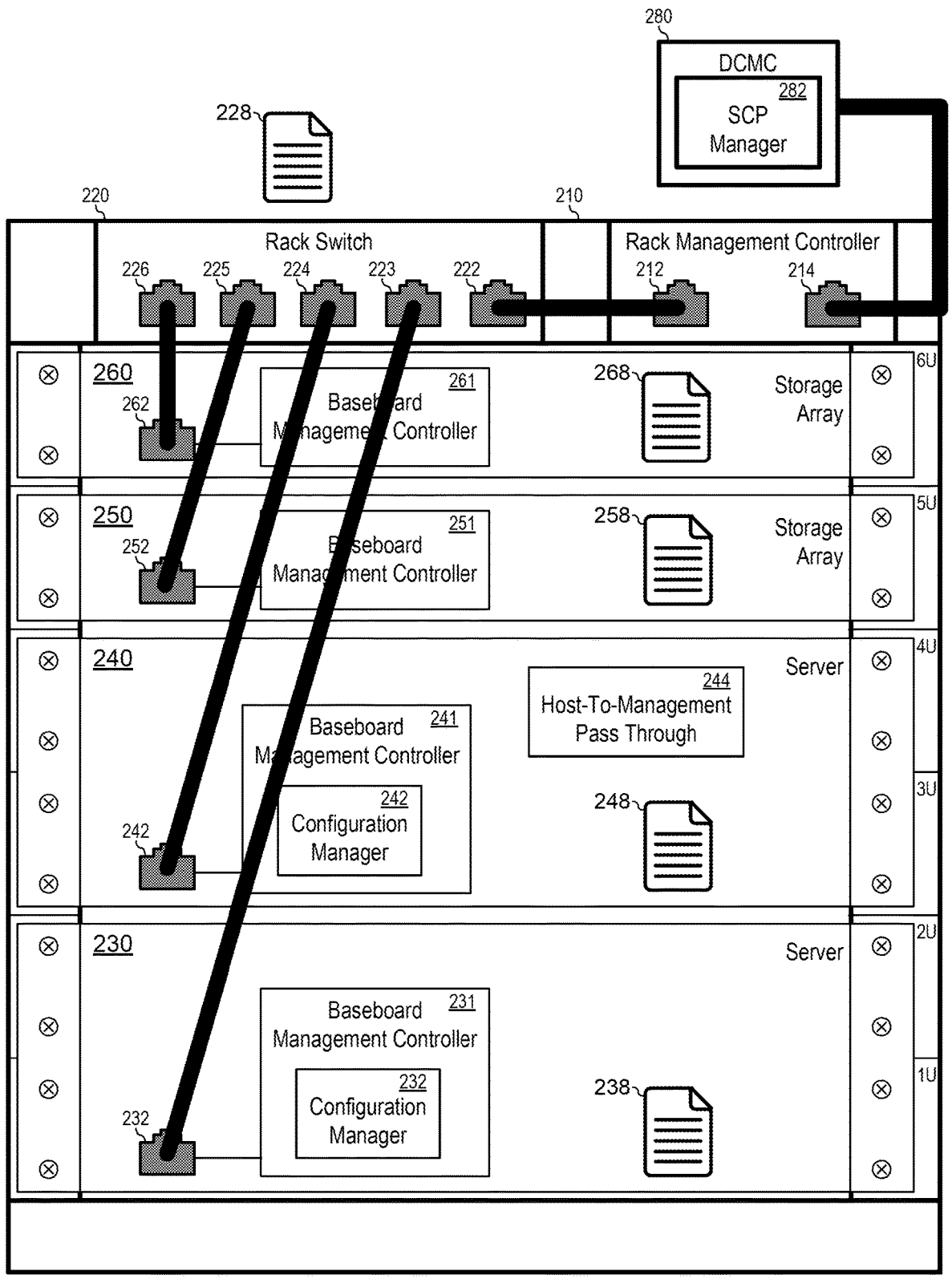
FIG. 2 is a block diagram of a server rack according to an embodiment of the present disclosure.

FIG. 2 illustrates a server rack 200 typical of server racks 110, 120, 130, 140, and 150. Server rack 200 includes a rack space that represents a standard server rack, such as a 19-inch rack equipment mounting frame or a 23-inch rack equipment mounting frame, and includes six rack units. The rack units represent special divisions of the rack space that are a standardized unit of, for example, 1.75 inches high. For example, a piece of equipment that will fit into one of the rack units shall herein be referred to as a 1-U piece of equipment, another piece of equipment that takes up two of the rack units is commonly referred to as a 2-U piece of equipment, and so forth. As such, the rack units are numbered sequentially from the bottom to the top as 1U, 2U, 3U, 4U, 5U, and 6U. The skilled artisan will recognize that other configurations for rack units can be utilized, and that a greater or lesser number of rack units in a server rack may be utilized, as needed or desired. For example, a rack unit can be defined by the Electronic Components Industry Association standards council.

Server rack 200 further includes a rack management controller 210 and a rack management switch 220, and is illustrated as being populated with two 2-U servers 230 and 240, and with two 1-U storage arrays 250 and 260. 2-U server 230 is installed in rack spaces 1U and 2U, 2-U server 240 is installed in rack spaces 3U and 4U, 1-U storage array 250 is installed in rack space 5U, and 1-U storage array 260 is installed in rack space 6U. Rack management controller 210 includes network connections 212 and 214, and rack switch 220 includes network connections 222, 223, 224, 225, and 226. As illustrated, rack management controller 210 is connected via network connection 214 to a management network that includes a DCMC 280 similar to DCMC 160, and is connected via network connection 212 to network connection 222 of rack switch 220 to extend the management network to servers 230 and 240, and to storage arrays 250 and 260. As such, server 230 includes a BMC 231 that is connected to network connection 223 via a network connection 232, server 240 includes a BMC 241 that is connected to network connection 224 via a network connection 242, storage array 250 includes a BMC 251 that is connected to network connection 225 via a network connection 252, and storage array 260 includes a BMC 261 that is connected to network connection 226 via a network connection 262. Here, the management network includes RMC 210, BMCs 231, 241, 251, and 261, and DCMC 280. DCMC 280 is configured to initiate management transactions with RMC 210 to monitor, manage, and maintain elements of server rack 200, of management switch 220, of servers 230 and 240, and of storage arrays 250 and 260 via respective BMCs 321, 241, 251, and 261.

BMC 231 operates to monitor, manage, and maintain server 230. In monitoring server 230, BMC 231 accesses various sensors for monitoring various physical characteristics of the server, such as temperature sensors, fan speed sensors, voltage sensors on the various voltage rails, current sensors on the voltage rails, humidity sensors, and the like, to characterize the environmental conditions within which the server is operating. BMC 231 further accesses various state information of the elements of server 230, such as by accessing I/O state information related to the operating condition of the elements of the server, and the like, to further characterize the environmental conditions within the elements of the server. BMC 231 further accesses various software and firmware information, such as processor loading information, memory and storage utilization information, network and I/O bandwidth information, and the like, to characterize the processing conditions of server 230.

BMC 231 further operates to provide the monitoring information to RMC 210 and to DCMC 280 via the management network, as needed or desired.

In managing server 230, BMC 231 utilizes the monitoring information from the server to provide inputs to control various physical operations of the server, such as fan speeds, voltage levels, processor clock rates, I/O speeds, and the like, to ensure that the environmental conditions of the server and the elements thereof remain within acceptable limits. BMC 231 further operates to provide indications as to the environmental and processing conditions to RMC 210 and DCMC 280, as needed or desired. For example, when temperature conditions within server 230 exceed a particular threshold, then BMC 231 can provide a high-temp indication to that effect to RMC 210 and the RMC can direct a heating/ventilation/air conditioning (HVAC) system of the data center to direct additional cooling to server 230. Similarly, when temperature conditions within server 230 drop below another threshold, then BMC 231 can provide a low-temp indication to that effect to RMC 210 and the RMC can direct the HVAC system to direct less cooling to server 230.

In managing server 230, BMC 231 further utilizes the monitoring information from the server to provide inputs to control various processing conditions of the server. For example, when processing conditions, such as processor loading or memory utilization, within server 230 exceed a particular threshold, then BMC 231 can provide a high-utilization indication to that effect to DCMC 280, and the DCMC can direct spare servers of the data center to come on line to offload the workload from the server. Similarly, when processing conditions within server 230 drop below another threshold, then BMC 231 can provide a low-utilization indication to that effect to DCMC 280 and the DCMC can direct initiate steps to shut down server 230 and place it into a pool of spare servers for the data center.

In maintaining server 230, BMC 231 operates to ensure that the operating thresholds, set points, and other limits are maintained, and to reset or change the thresholds, set points and other limits as needed or desired. Further, BMC 231 operates to maintain software and firmware in server 230, as needed or desired. BMCs 241, 251, and 261 operate to monitor, manage, and maintain respective servers 240, 250, and 260 similarly to the way that BMC 231 operates on server 230, as described above. Moreover, RMC 210 operates to monitor, manage, and maintain functions and features of server rack 200, as needed or desired. Further, RMC 210 operates as a central node of the management network between BMCs 231, 241, 251, and 261, and DCMC 280, collecting monitoring information from the BMCs and providing management and maintenance information to the BMCs, as needed or desired.

DCMC 280 includes a SCP manager 282 that operates to create, modify, and deploy SCPs for the elements of server rack 200. In particular, rack switch 220 includes a SCP 228, servers 230 and 240 include respective SCPs 238 and 248, and storage arrays 250 and 260 include respective SCPs 258 and 268. In general, SCP manager 282 can create, modify, and deploy SCPs 228, 238, 248, 258, and 268 separately and as needed or desired. For example, if it is determined that server 230 needs a new configuration setting applied, SCP manager 282 operates to modify a copy of SCP 238 maintained at DCMC 280 and to deploy the modified SCP to the server. In some instances, SCP manager 282 deploys SCPs by directly communicating the SCPs to the elements of server rack 200 for the elements to apply to themselves, as needed of desired. For example, rack switch 220 may include an in-band mechanism, such as a management VLAN that permits the rack switch to receive management information and to deploy the management information to the rack switch. Here, SCP manager 282 can deploy SCP 228 via the in-band mechanism to rack switch 220, and the rack switch operates to make the modifications to its configuration as provided by the SCP. In other instances, SCP manger 282 deploys SCPs by communicating the SCPs to a management controller of the elements, and the management controller applies the SCPs to the associated elements. For example, server 230 includes BMC 231. Here, SCP manager 282 can deploy SCP 238 via an out-of-band transaction to BMC 231, and the BMC operates to make the modifications to the configuration of server 230 as provided by the SCP.

In a particular embodiment, SCP manager 282 does not create, modify, and deploy SCPs individually on the elements of server rack 200. Instead, SCP manager 282 maintains various operational SCP templates based upon different types or classes of elements within server rack 200 and within the data center that includes the server rack. For example, where elements of the data center are of a same type, such as where server racks are deployed with a common top-of-rack switch, or where a large number of blade servers of a particular model are deployed throughout the data center, SCP manager 282 can implement one operational SCP template for the top-of-rack switches and a different operational SCP template for the blade servers. This reflects the fact that it may be desirable to maintain many of the configuration settings within a particular type of equipment in common across all of the instances of that type of equipment. Thus by maintaining a smaller number of operational SCP templates, SCP manager 282 can more easily maintain the elements of the data center. For example, where a configuration setting that is common for a large number of the elements of the data center, such as a RTC setting, SCP manger 282 can make changes to the common setting in the smaller number of operational SCP templates and deploy the changes by exporting the templated SCPs across the data center. Then, only when a change effects only one element of the data center, such as a MAC or IP address, SCP manager can deploy changes to the individual SCPs as described above.

In a particular embodiment, in creating, modifying, and deploying SCPs, SCP manager 282 operates to maintain dependency information between the configuration settings in the operational SCP templates, and to deploy updated SCPs based upon the dependency information. For example, as noted above, many of the configuration settings for a particular type of equipment may be modified and deployed without reference to any other equipment in the data center. Consider a server, such as server 230. Changes to the RTC setting of the server may not depend upon, interfere with, or be interfered with by any other equipment in the data center. Thus the RTC setting of an operational SCP template for servers may indicate that changes to the RTC setting of servers is not dependent upon any other equipment of the data center. On the other hand, a change to the boot directory of a server may necessitate updating of one or more storage elements like storage arrays 250 and 260, before a next boot cycle of the server is performed, and so the operational SCP template for servers may indicate that changes to the boot directory of servers must be accompanied by the consequent changes to storage arrays prior to any system reboot of the servers. Further, a change to a VLAN of a server may cause unintended loss of data if the other elements that are associated with the modified VLAN setting are not modified before the server. For example, where RMC 210 and BMC 242 are to communicate with each other over a new VLAN, it may be necessary to first provide a modified SCP for rack switch 220, setting up the rack switch to accommodate the new VLAN, before either the RMC or server 240 are updated. Table 1, below, illustrates an example of an operational SCP template for server equipment in a data center. It will be understood that, for some modifications to an operational SCP template, there will be multiple overlapping, and possibly conflicting dependencies. As such, an operational SCP template may further specify a priority of action for the dependency actions, as needed or desired.

TABLE 1

Exemplary Operational SCP Template For A Server

| Setting | Dependency | Timeframe |
| --- | --- | --- |
| Server RTC | N/A | N/A |
| Server Boot Directory | Storage Array | Prior to Next Boot |
| Management VLAN | 1) Rack Switch | Before Server |
|  | 2) RMC | Simultaneous With Server |

Figure 3:
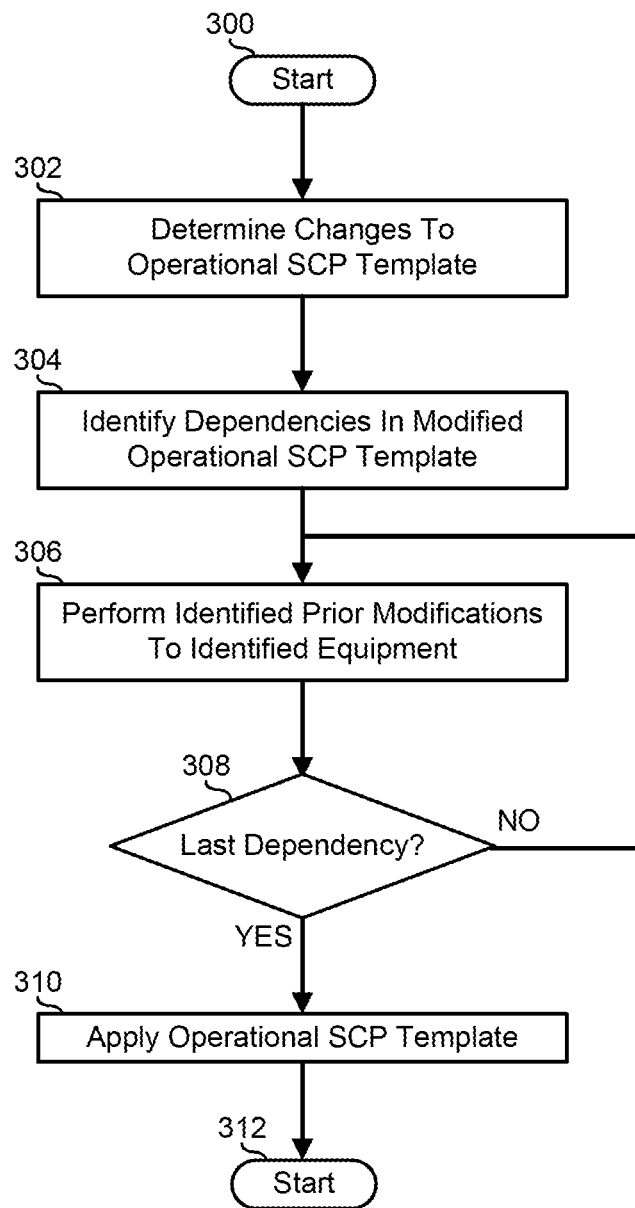
FIG. 3 is a flowchart illustrating a method for applying operational system configuration profile templates in a data center according to an embodiment of the present disclosure.

FIG. 3 illustrates a method for applying operational SCP templates in a data center, starting at block 300. Configuration setting changes to an operational SCP template are determined in block 302. The changes are evaluated with reference to the operations SCP template to identify the dependencies that are created by the configuration setting changes in block 304. The change with the most dependencies to resolve is selected and the identified prior activities and modifications are performed on the identified equipment in block 306. Note that here, the mitigation of one or more dependency may need to be resolved by the modification of one or more other operational SCP templates or individual SCPs, as needed or desired. A decision is made as to whether or not the resolved dependency is the last unresolved dependency in decision block 308. If not, the "NO" branch of decision block 308 is taken and the method returns to block 306 where the change with the next most dependencies to resolve is selected and the identified prior activities and modifications are performed on the identified equipment. If the resolved dependency is the last unresolved dependency, the "YES" branch of decision block 308 is taken, the operational SCP template is applied to the identified equipment in block 310, and the method ends in block 312.

In a particular embodiment, BMC 231 includes a configuration manager 232 that operates to maintain the configuration options of server 230, to determine when changes are made within the server, to determine from SCP manager 282 whether or not there are any dependencies related to the changes, and to take steps to mitigate the dependencies on server 230. Note that configuration manger 232, as illustrated, is local to server 230, but this is not necessarily so, and the functions and features of the configuration manager, as described below, may be applied equally to other equipment of data center 200, as needed or desired. Here, in addition to providing SCP 238 to BMC 231, SCP manager 282 also provides, on an as needed basis, a remediation policy to the BMC. The remediation policy can be provided as a file that includes the dependency information from the operational SCP template for server 230, such that configuration manager 232 can determine when a configuration setting change involves any dependencies.

Here, when configuration manager 232 detects a change to the configuration options of server 230, the configuration manager provides a request to SCP manger 282 over the management network to request the remediation policy information. Then configuration manger 232 determines if the configuration change involves any dependencies. If so, then configuration manager 232 operates to implement the remediation steps associated with the dependencies, if the dependencies implicate configuration settings within server 230. If the identified dependencies are outside of server 230, and therefore beyond the ability of configuration manager 232 to remedy, then the configuration manager sends a request to SCP manager 282 indicating that the configuration manager intends to perform the configuration change, and requesting the SCP manger to perform the remedial actions on the other elements of data center 200, as indicated by the remediation policy information. Here, configuration manager 232 can hold the requested configuration change from being implemented until SCP manager 282 indicates that the remediation actions have been performed. Then configuration manager 232 performs the requested configuration change.

In this way, the amount of management network traffic is reduced because BMC 231 initiates action only when a configuration setting is requested to be changed. Otherwise, SPC manger 282 would be required to poll all the elements of the data center to ensure that all requested configuration changes are evaluated for potential dependencies, thus consuming an increased amount of the processing resources on the management network. In a particular embodiment, when configuration manager 232 detects a configuration change request and requests the remediation policy information from SCP manger 282, the SCP manager provides the full remediation policy for server 230. In this way, configuration manager 232 has access to all of the dependency mitigation actions, and, on the assumption that one configuration change will be rapidly followed by other configuration change request, will not need to re-download the remediation policy information. In another embodiment, when configuration manager 232 detects a configuration change request and requests the remediation policy information from SCP manger 282, the SCP manager provides only the remediation policy information related to the requested configuration change.

Figure 4:
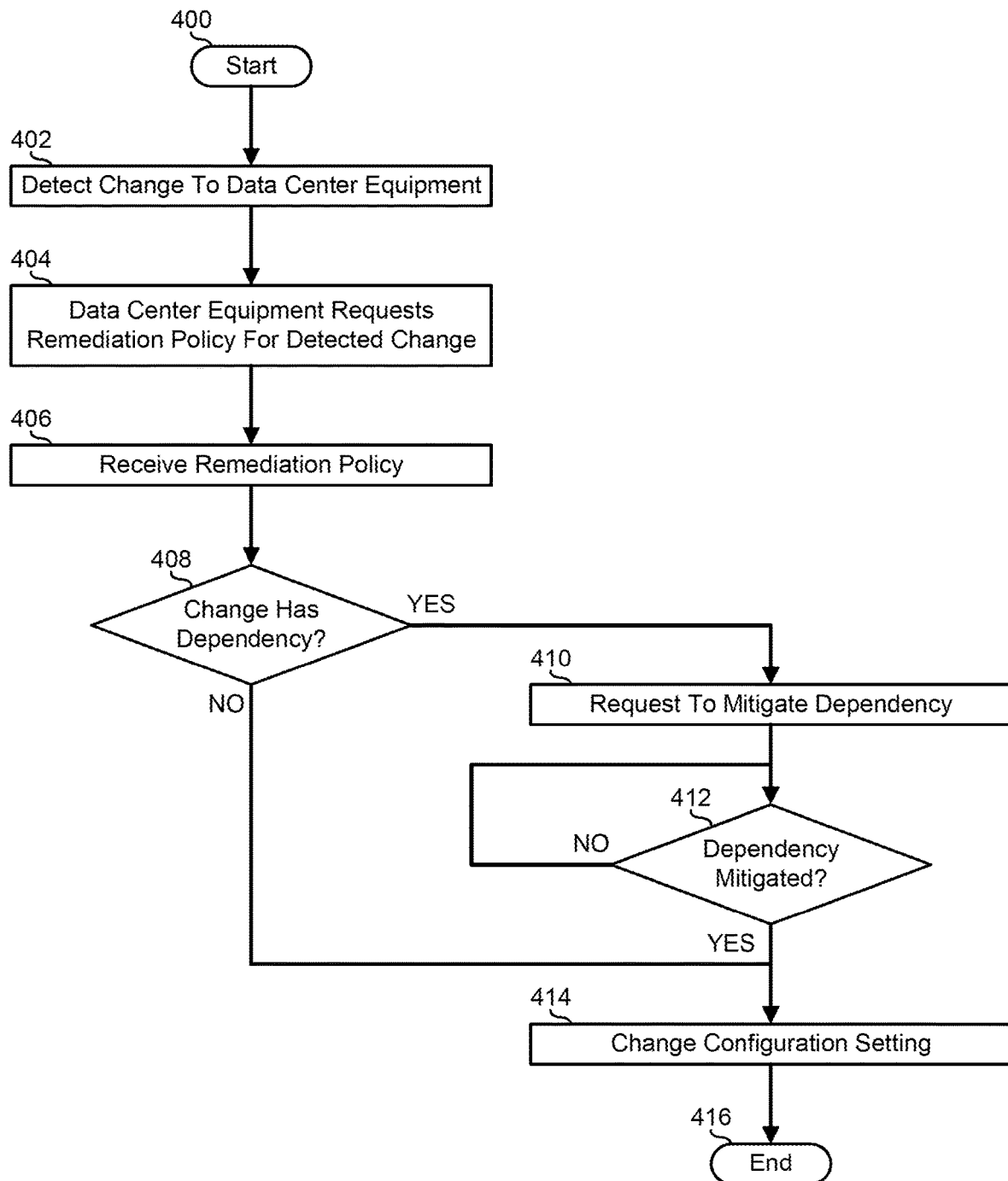
FIG. 4 is a flowchart illustrating a method for applying configuration setting changes in a data center according to an embodiment of the present disclosure.

FIG. 4 illustrates a method for applying configuration setting changes in a data center, starting at block 400. A request to change a configuration setting of an element of a data center is detected in block 402. Here, the element to be changed has detected the change request. The element that detected the change request issues a request to a DCMC to receive a remediation policy related to the change request in block 404. The DCMC determines whether or not the requested change has any dependencies based upon the operational SCP template and provides a remediation policy in block 406. A decision is made by the element of the data center as to whether or not the remediation policy received from the DCMC indicates any dependencies related to the detected configuration setting change request in decision block 408. If not, the "NO" branch of decision block 408 is taken, the requested configuration setting is changed in block 414, and the method ends in block 416. If the remediation policy received from the DCMC indicates dependencies related to the detected configuration setting change request, the "YES" branch of decision block 408 is taken and the element of the data center requests the DCMC to perform any mitigations associated with the requested change on other elements of the data center in block 410. A decision is made as to whether or not the dependencies have been mitigated in decision block 412. If not, the "NO" branch of decision block 412 is taken and the method returns to decision block 412 until the dependencies have been mitigated. When the dependencies have been mitigated, the "YES" branch of decision block 412 is taken, the requested configuration setting is changed in block 414, and the method ends in block 416.

In another embodiment, server 240 includes a host-to-management pass through 244 and BMC 241 includes a configuration manager 242 similar to configuration manager 232. Host-to-management pass through 244 represents an in-band agent resident in a hosted environment of server 240 that communicates management information between the hosted environment of the server and the out-of-band environment of BMC 241. In particular, host-to-management pass through 244 operates to track the software and applications operating on the hosted environment and to determine the hardware resources that are utilized by the software and applications. Host-to-management pass through 244 then identifies the operating software and applications, along with the associated hardware resources utilized thereby, to configuration manger 242. Communication manager 242 operates to maintain the configuration options of server 240, to determine when changes are made to the configuration settings of the server, and to determine whether the configuration setting changes impact the hardware resources of the operating software and applications on the hosted environment of the server. Note that configuration manger 242 and host-to-management pass through 244, as illustrated, are local to server 240, but this is not necessarily so, and the functions and features of the configuration manager and the host-to-management pass through, as described below, may be applied equally to other equipment of data center 200, as needed or desired. When configuration manger 242 determines that a configuration setting change will impact the hardware resources of the operating software and applications on the hosted environment of server 240, the configuration manager operates to provide a warning that the proposed configuration setting changes may adversely impact the operation of the operating software and applications. Such a warning can be provided to a user of server 240, or to DCMC 280 via the management network, as needed or desired. In addition to the warning, configuration manager 242 operates to prevent the proposed configuration changes until an authorization for such changes is received by the configuration manager, such as from the user or from DCMC 280, as needed or desired.

Figure 5:
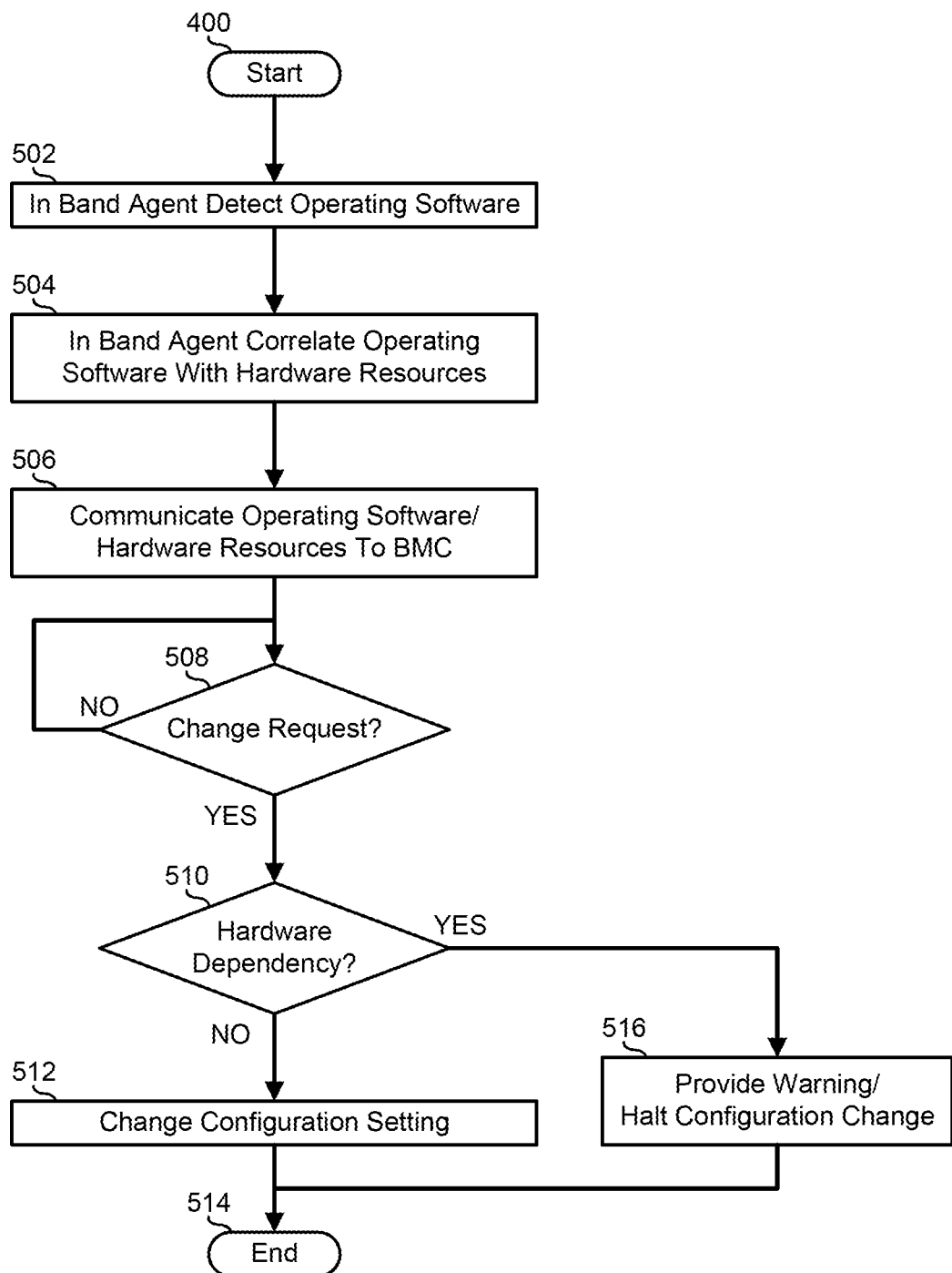
FIG. 5 is a flowchart illustrating a method for assessing configuration changes on applications running in a server according to an embodiment of the present disclosure.

FIG. 5 illustrates a method for assessing configuration changes on applications running in a server, starting at block 500. An in-band agent, such as a host-to-management pass through, detects the operating software and applications in the hosted environment of a particular piece of equipment in a data center in block 502. The in-band agent correlates the operating software and applications with the hardware resources utilized thereby in block 504. The in-band agent communicates information related to the operating software and applications and the associated hardware resources to a management controller of an out-of-band environment of the piece of equipment in block 506. A decision is made by the management controller as to whether or not a configuration setting change has been requested in decision block 508. If not, the "NO" branch of decision block 508 is taken and the method loops to decision block 508 until a configuration setting change has been requested. After a configuration change has been requested, the "YES" branch of decision block 508 is taken and a decision is made as to whether or not the configuration setting change is associated with a hardware resource dependency in decision block 510. If not, the "NO" branch of decision block 510 is taken, the configuration setting is changed in block 512, and the method ends in block 514. If the configuration setting change is associated with a hardware resource dependency, the "YES" branch of decision block 510 is taken, the management controller provides an warning that the pending configuration setting change is associated with a hardware resource dependency and halts execution of the configuration setting change in block 516, and the method ends in block 514.

Figure 6:
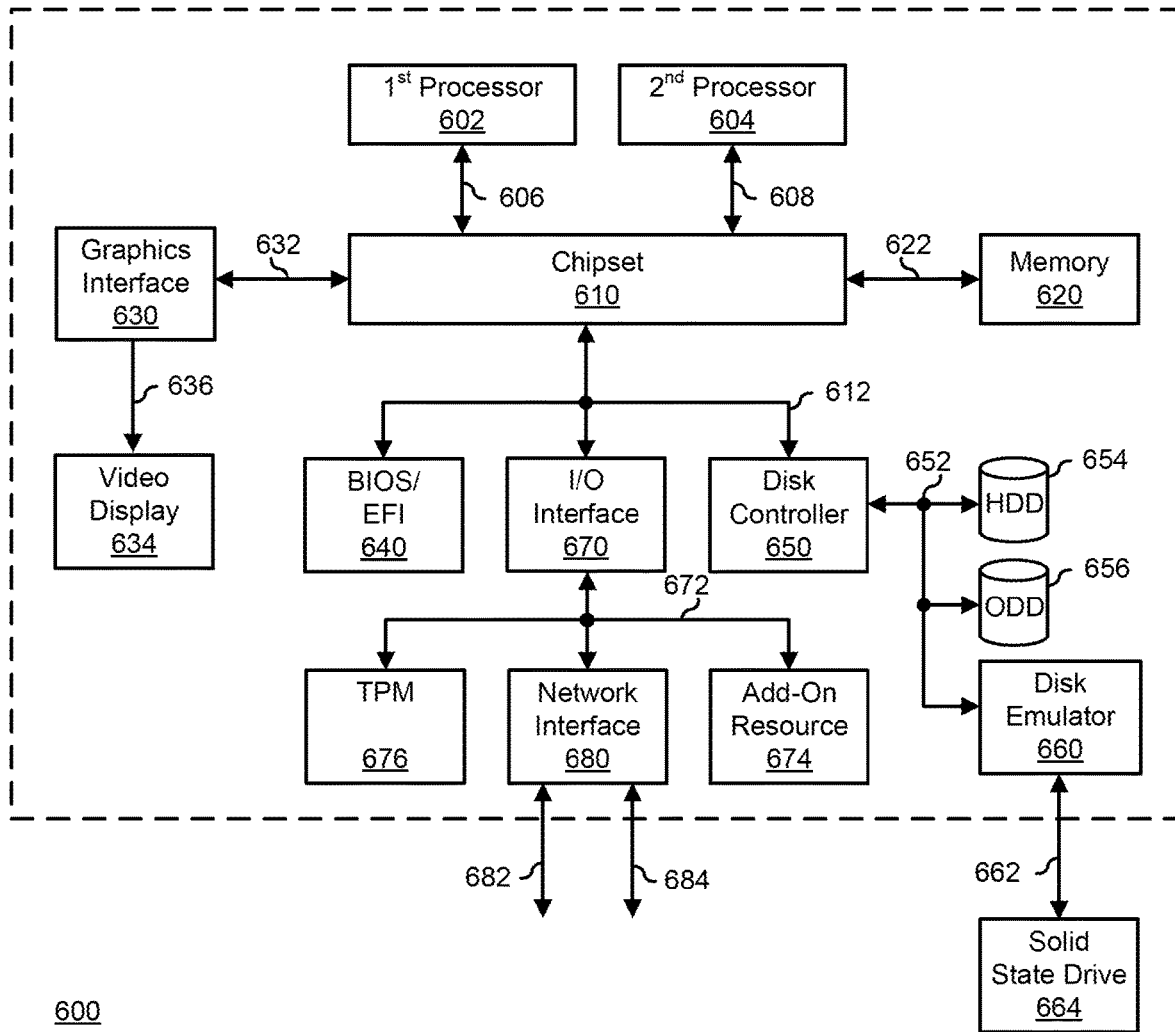
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory to store code; and
a processor configured to execute the code to:
determine to change a first configuration setting for the information handling system;
receive a first remediation policy related to the first configuration setting from a configuration management system in response to determining to change the first configuration setting;
determine from the first remediation policy that the change to the first configuration setting is dependent upon a configuration change to a device, the device being separate from the information handling system;
determine whether the configuration change to the device is necessary prior to changing the first configuration setting, concurrently with changing the first configuration setting, or prior to a next system boot of the information handling system;
change the first configuration setting in response to a first indication that a second configuration setting of the device has been changed when the configuration change to the device is necessary prior to changing the first configuration setting;
determine to change a second configuration setting for the information handling system;
receive a second remediation policy related to the second configuration setting from the configuration management system in response to determining to change the second configuration setting;
determine from the second remediation policy that the change to the second configuration setting does not necessitate the configuration change to the device; and
change the second configuration setting in response to determining that the change to the second configuration setting does not necessitate the configuration change to the device.

2. The information handling system of claim 1, the processor further configured to execute code to:
send a request to the configuration management system to send the remediation policy in response to determining to change the first configuration setting.

3. The information handling system of claim 1, the processor further configured to execute code to:
receive the first indication from the configuration management system.

4. The information handling system of claim 1, wherein the first remediation policy and the second remediation policy are a same remediation policy.

5. The information handling system of claim 1, wherein the configuration management system operates in accordance with an Intelligent Platform Management Interface.

6. The information handling system of claim 1, wherein the first configuration setting comprises a common Virtual Local Area Network setting.

7. A method, comprising:
determining, by an information handling system, to change a first configuration setting for the information handling system;
receiving, by the information handling system, a first remediation policy related to the first configuration setting from a configuration management system in response to determining to change the first configuration setting;
determining from the first remediation policy that the change to the first configuration setting is dependent upon a second configuration change to a device, the device being separate from the information handling system;
determine whether the configuration change to the device is necessary prior to changing the first configuration setting, concurrently with changing the first configuration setting, or prior to a next system boot of the information handling system;
changing the first configuration setting and a second configuration setting of the device concurrently when the configuration change to the device is necessary concurrently with changing the first configuration setting;
determining to change a second configuration setting for the information handling system;
receiving a second remediation policy related to the second configuration setting from the configuration management system in response to determining to change the second configuration setting;
determining from the second remediation policy that the change to the second configuration setting does not necessitate the configuration change to the device; and
changing the second configuration setting in response to determining that the change to the second configuration setting does not necessitate the configuration change to the device.

8. The method of claim 7, further comprising:
sending a request to the configuration management system to send the remediation policy in response to determining to change the first configuration setting.

9. The method of claim 7, further comprising:
receiving the first indication from the configuration management system.

10. The method of claim 7, wherein the first remediation policy and the second remediation policy are a same remediation policy.

11. The method of claim 7, wherein the configuration management system operates in accordance with an Intelligent Platform Management Interface.

12. The method of claim 7, wherein the first configuration setting comprises a common Virtual Local Area Network setting.

13. An information handling system, comprising:
a configuration management system; and
a first processing device configured to:
determine to change a first configuration setting for the information handling system;
receive a first remediation policy related to the first configuration setting from a configuration management system in response to determining to change the first configuration setting;
determine from the first remediation policy that the change to the first configuration setting necessitates a configuration change to a second processing device prior to changing the first configuration setting, the device being separate from the information handling system;
change the first configuration setting in response to a first indication that a second configuration setting of the device has been changed;
determine to change a second configuration setting for the information handling system;
receive a second remediation policy related to the second configuration setting from the configuration management system in response to determining to change the second configuration setting;
determine from the second remediation policy that the change to the second configuration setting does not necessitate the configuration change to the device; and
change the second configuration setting in response to determining that the change to the second configuration setting does not necessitate the configuration change to the device.

14. The information handling system of claim 13, the first processing device further configured to:
send a request to the configuration management system to send the remediation policy in response to determining to change the first configuration setting.

15. The information handling system of claim 13, the first processing device further configured to:

receive the first indication from the configuration management system.

16. The information handling system of claim 13, wherein the first remediation policy and the second remediation policy are a same remediation policy.

17. The information handling system of claim 13, wherein the configuration management system operates in accordance with an Intelligent Platform Management Interface.

* * * * *